United States Patent Office 3,461,243

Patented Aug. 12, 1969

3,461,243

CIRCUIT FOR IMPULSE-WISE ENERGY TRANSMISSION, ESPECIALLY FOR TIME MULTIPLEX EXCHANGE SYSTEMS

Hans Höschler, Munich, Germany, assignor to Siemens Aktiengesellschaft, Erlangen, Germany, a corporation of Germany Continuation of application Ser. No. 362,780, Apr. 27, 1964. This application Apr. 1, 1968, Ser. No. 718,009

Claims priority, application Germany, Apr. 29, 1963, S 84,994

Int. Cl. H04j 3/02

U.S. Cl. 179—15 22 Claims

ABSTRACT OF THE DISCLOSURE

A switching circuit comprising line storers and diodes enabling a single multiplex bar to transmit pulses in both directions.

Cross reference to related applications

This is a continuation of my prior application of the same title, Ser. No. 362,780, filed Apr. 27, 1964 and now abandoned.

The invention relates to a circuit which can be used especially for exchange systems which operate according to the time-multiplex principle and are provided, for example, for telephone purposes. A time-multiplex exchange system, as is well-known, is characterized by the feature that the messages to be exchanged in each case are modulated on impulse sequences which are offset timewise against each other and thereby permit a multiple utilization of connection lines. Over the circuit mentioned the subscribers are connected with each other at will, the connections leading in each case, for example, over a multiplex bar. For this purpose, in each case, synchronously with the impulses of impulse sequences offset against one another, switches belonging to the circuit are closed, and during the pulse pauses the switches are open. These switches are situated, for example, in line sections which lead to subscriber stations. Because of the special manner of operation of the circuit under consideration, the opening times of the switches are always considerably longer than their operating or closed time. In any case, however, it is only during the operating time that energy can be transmitted over the switches involved, and such energy transmission, therefore, takes place impulse-wise.

Several circuits are known in which various means are employed to carry out such impulse-wise energy transmissions. Of interest here, for example, is a circuit (see German Patent 1,114,228, corresponding to British Patent 822,297, published Oct. 1, 1959, columns 14/15 and FIGURE 9) in which, in the course of the energy transmissions for the connection of two line sections according to the multiplex principle, first of all a remanence-affected ferrofagnetic ring core, which serves as energy storer, is remagnetized and, with the aid of a reading impulse, is subsequently restored to its initial magnetic state. In the feeding of the reading impulse, a delivery impulse is produced by a special winding of the ring core, which is required to charge a condenser, terminating the one line section involved, and functioning as a line storer, with the fed-in energy being stored in the form of an electrical charge. This charge is then subsequently retransmitted over the line. But to prevent this charge from flowing back to the ring core, in the course of an undesired following discharge impulse, the transmission path must immediately be interrupted with the termination of the previously fed-in reading impulse.

Of further interest, for example, are circuits in which, in the course of the energy transmissions here considered, make use of the multiplex principle in which, from a condenser, serving as energy storer, over a series inductance, a charge is retransmitted to another condenser which, in the same manner as in the previously described example, terminates a line section as a line storer. In this case, in the switching through of the transmission path there results a half-oscillation of the oscillatory circuit there formed, in the course of which, for example, the charge is transferred from one condenser to the condenser terminating the line section (see, for example the publication "Pulse Generator," published by Glasoe and Lebacqz, New York and London, published 1948, pp. 307 and 308, especially FIGURES 8.17 and 8.18). Here, too, care must be taken that the transmission path previously switched through is again interrupted precisely with the end of the half-oscillation involved.

It should here be particularly noted that such circuits with line sections to be connected according to the multiplex principles, i.e., circuits to which the invention also is applicable, can also relate to other devices than an exchange system, as for example, to a transmission device, such as a multichannel program transmission device for radio purposes (see German Patent 1,084,329, published June 30, 1960), in which signals belonging to two different stereo channels must be correctly transmitted to desired line sections.

To insure that in all these circuits the necessary pulse-wise energy transmissions will take place in the intended manner, for the switching through and interruption of the transmission paths involved, switches must be provided, whose operating times are precisely adapted to the duration of the partial oscillations or other processes involved which take place in the storage operations. If the operating time is too short, the particular energy transmission is incomplete, since a part of the energy to be transmitted remains in the storer to be emptied. If the operating time is too long, a retransfer may occur of at least a part of the energy just transmitted to the previous emptied storer. The switch involved must open with certainty at the right point of time, to insure the prevention of further energy transmissions through which at least a part of the energy just transmitted would pass to a wrong place, especially to other line sections switches just operated, resulting in possible cross talk between different connection paths, as these energy transmissions, because of the utilization of the multiplex principle, are conducted over multiplex bars, to which also other line sections are connectable over switches.

It can now be achieved according to the invention, as hereinafter set forth, that the above-described conditions for the precise operation of the switches involved are not required, thereby, among other things, facilitating the control of the switches.

The invention relates, therefore, to a circuit for pulse-wise energy transmission between line sections, in which the line sections are each terminated with a line storer which is connected over switches, operated in each case through sequences of control impulses, to at least one multiplex bar. Such circuit is especially suited for the connection of line sections in time multiplex exchange systems, and is characterized by the feature that for the energy transmissions, by means of more or less great impulses of exclusively one and the same polarity, rectifiers are inserted in the transmission paths which are so poled that they exclusively permit the passage of current impulses bringing about the required energy transmissions, but block off undesired retransfers. By utilization of this measure, the length of the operating times of the switches for the switching through of the transmission paths can be liberally dimensioned with relatively great tolerances, without any danger that a retransfer will take place after an intended energy transmission, as the particular recifier will now be poled in blocking direction.

It has thus far been assumed that for the energy transmissions in each case there occur exclusively impulses of the same polarity. If this is not inherently the case, this can be achieved by additional measures, even when alternating voltages and alternating currents of differing frequency are to be transmitted over the particular connection. In this case one proceeds from a circuit in which low-pass filters are inserted in circuit with the line storers, the limit frequency of such filters being smaller than half the sequence frequency of the control impulses for the switches allocated to the line storers. In this circuit such low-pass filters are to be connected with the line sections over transformers, to whose primary windings the alternating potentials to be transmitted are supplied, and to whose secondary windings a bias voltage is applied which corresponds at least to the amplitude of the maximum alternating voltage to be transmitted and has the same polarity as the charges which are to occur in condensers, for example, serving as line storers.

For the circuit according to the invention, several examples are given in the following and described in detail with the aid of FIGS. 1 to 7, in which like reference characters represent like or corresponding parts.

First, an explanation will be given as to how the rectifiers can be inserted into the various possible transmission paths. Such an insertion can be made in various ways. Thus, for example, the rectifiers can be inserted into the transmission paths involved in each case with the aid of switches, which are disposed in series with the rectifiers and are operated for the switching through of the transmission paths involved with the aid of control impulses. If for the switching through of the transmission paths, switches are used which permit an energy transmission exclusively in the intended direction, and therefore, simultaneously include rectifiers, special rectifiers are superfluous.

Figure 1:
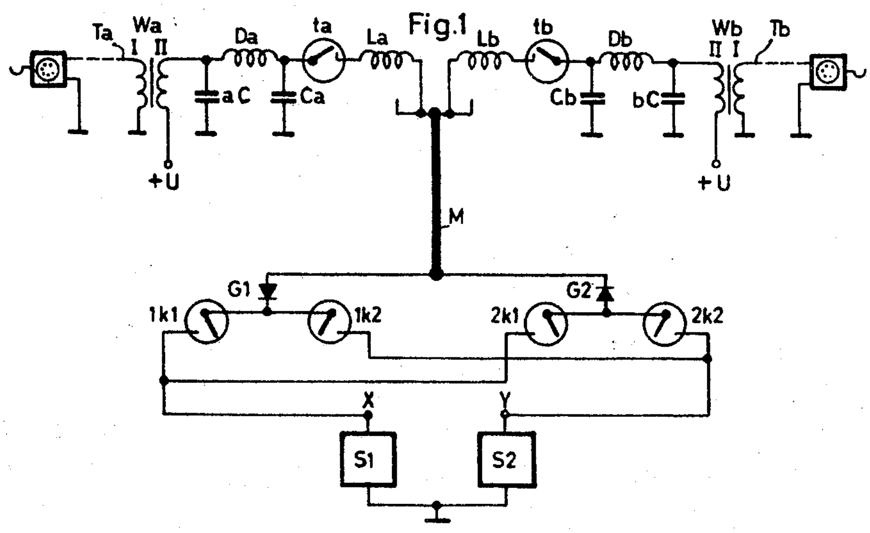
FIG. 1 illustrates an embodiment of the invention pulsewise energy transmissions are conducted over one multiplex bar.
Figure 2:
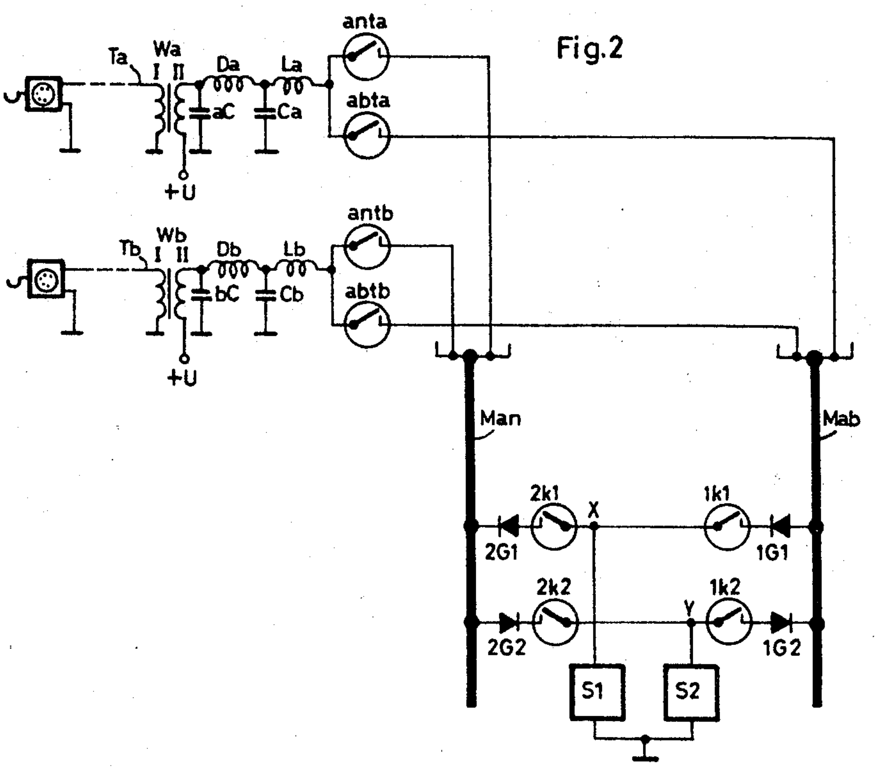
FIG. 2 illustrates an embodiment in which two multiplex bars are employed.

The circuit examples shown in FIGS. 1 and 2 have in common the feature that in the course of the energy transmission path in each case there are disposed two central intermediate storers, which, during the connection of at least one of the two line storers involved to a multiplex bar, are alternately connectable to the multiplex bars involved, with the switches being operated in such a sequence that, in each case, during the simultaneous operation of a switch allocated to a line section and of a switch allocated to one of the intermediate storers, an energy transmission can take place only to a previously emptied storer. In the circuit according to FIG. 1 the intermediate storer S1 can be connected both over switch 1*k*1 and over switch 2*k*1 to the single multiplex bar M, while the intermediate storer S2 can be connected to such multiplex bar over switches 1*k*2 and 2*k*2. In series with the above-mentioned switches concerned there lie, in the switching circuit according to FIG. 2, rectifiers 1G1, and 2G1, 1G2 and 2G2, which rectifiers are differently poled in such a manner that in each case through operation of a suitable switch a current can flow in the intended current direction to only the two multiplex bars there employed. In the circuit according to FIG. 1, however, only two rectifiers G1 and G2 are required, since only one multiplex bar is there present. These rectifiers likewise are differently poled, so that in an energy transmission, through operation of a suitable switch, in each case a current of the intended direction can flow. For the sequence in which the switches can be operated there are various possibilities which are hereinafter explained with respect to individual circuit examples.

Considering more closely the circuit according to FIG. 1, as previously mentioned, there is present only a single multiplex bar. In the use of this single multiplex bar M, the energy transmissions for all the connections passing over such multiplex bar are led through over the same two intermediate storers S1 and S2. For this purpose in each case only the first of the cooperable line storers is connected, thereupon only the second and again only the first of these line storers to the multiplex bar. As first line storer may be designated, for example, the condenser *Ca* and as second line storer the condenser *Cb*. During the connection of the first line storer *Ca* to the multiplex bar and temporary connection of the first intermediate storer S1 thereto, there takes place an energy transmission to the latter, and during the connection of the second line storer *Cb* and temporary connection of the second intermediate storer S2, and energy transmission will take place to the latter. Alternating therewith, the first intermediate storer S1 is additionally temporarily connected, from which an energy transmission thereupon takes place to the second line storer *Cb*. During the following connection of the first line storer *Ca* there takes place an additional and temporary connection of the intermediate storer S2 and from there an energy transmission to the first storer *Ca*. The two line storers *Ca* and *Cb* have now exchanged their energy content. Accordingly the two intermediate storers S1 and S2 are usable for the energy exchange between other line storers. Thus, for multiple connections the described energy transmissions can be consumated over the multiplex bar and the intermediate storers until, according to the requirement of the scanning frequency involved, energy transmissions from the first connection are to be repeated. There then again follows energy transmissions for the second connection, etc.

The structure of the circuit shown in FIG. 1 will now be described in detail. In this circuit, connectable to the multiplex bar M are several line storers, which close off respective line sections, of which the two line sections T*a* and T*b* are illustrated, and to which belong the respective line storers *Ca* and *Cb*. The line storer *Ca* is connectable through the switch *ta*, and the line storer *Cb* is connectable through the switch *tb* to the multiplex bar. Such a switch may be operated, by means of a sequence of control impulses in a known manner (see, for example, French Patent 1,072,144, published on Sept. 8, 1954). If the sequence of control impulses is periodic, they can be designed as control pulses. Also the switches over which the two intermediate storers S1 and S2 are connectable to the multiplex bar M may be operated in a similar manner. These switches are centrally arranged and are designated 1*k*1, 1*k*2, 2*k*1 and 2*k*2. A transmission path leads in each case from a line storer to an intermediate storer or vice versa. As already mentioned, there are additionally two rectifiers G1 and G2, which, by means of the centrally located switches, can in each case be inserted into, a transmission path just switched through, the latter being operated with the aid of control impulses, and disposed in each case, in series with such rectifiers. Each of the two intermediate storers S1 and S2 may be connected, over one of the two switches allocated to it, with the one or other of the two rectifiers G1 and G2. Thus, for example, the intermediate storer S1 can be connected over the switches 1*k*1 and 2*k*1 either with the rectifiers G1 or with rectifier G2.

Accordingly, for an energy transmission from a line storer to an intermediate storer an impulse can be transmitted over a rectifier to the intermediate storer S1 and then, for an energy transmission from the same intermediate storer to another line storer, an impulse can be taken from the intermediate storer S1 over the other rectifier. In each case the rectifier with suitable poling is inserted in the transmission path by means of the switches 1*k*1 and 2*k*2. The two energy transmissions thus collectively effect an energy transmission between the two line storers involved. It is assumed, however, that in these energy transmissions in the line storers, only impulses of one and the same polarity occur.

If as line storers and also as intermediate storers condensers are used and coils having inductance are inserted into the transmission paths, then through the impulses occurring in the energy transmissions these condensers will be discharged and recharged.

Figure 3:
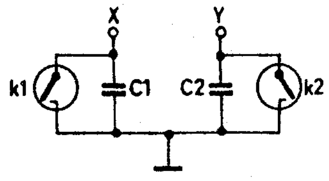
FIGS. 3, 4 and 5 illustrate examples of intermediate storers utilizable in energy transmissions.

The intermediate storers S1 and S2 are illustrated in the circuit of FIG. 3 in the form of condensers C1 and C2, which are to be connected to the switching points X and Y of FIG. 1. The coils L*a* and L*b* form the inductance allocated to the respective line sections.

The occurrence of impulses in energy transmission will now be described in detail. If, for example, the condenser C*a* serving as line storer has been positively charged and if the two switches *ta* and 1*k*1 are then operated simultaneously for a sufficient length of time, with the aid of a half-oscillation in the oscillatory circuit here switched from the switching elements C*a*, L*a* and C1, the charge of condenser C*a* is transmitted to condenser C1 over the rectifier G1, throughout which the current impulse flows in pass direction. After the end of the transmission a retransfer cannot take place as it is blocked by the rectifier G1. A special time precision thus is not required for the operation of the switches *ta* and 1*k*1, and care merely need be taken, therefore, that the operating time of these switches is longer than the duration of a half-oscillation. Correspondingly, too, special precision measures for the tuning of the oscillatory circuit involved likewise is unnecessary, and great tolerances in the condensers C*a* and C1 and for coil L*a* is permissible.

According to the energy transmission already described, an energy transfer from the condenser C1 serving as intermediate storer to the condenser C*b* serving as line storer must occur, in which case the switches *tb* and 2*k*1 are simultaneously operated for a sufficient time. The charge of condenser C1 is thereby transmitted to condenser C*b*, likewise with the aid of a half-oscillation. The current pulse associated with it flows this time, through the rectifier G2 in pass direction, this rectifier, being poled opposite to rectifier G1. A retransfer is prevented, since this is blocked by the rectifier G2. In a corresponding manner it is also possible to carry out energy transmissions over the other condenser C2 serving as intermediate storer, in which process the switches 1*k*2 and 2*k*2 participate. Besides energy transmissions from the condenser C*a* serving as line storer to the condenser C*b* serving as line storer, there may, of course, also take place energy transmissions over one of the condensers C1 and C2 serving as intermediate storers in reverse direction, that is, from condenser C*b* to condenser C*a*, which are developed in an entirely similar manner to the energy transmissions heretofor described.

Expediently, the condensers serving as intermediate storers may, in each case, be short-circuited with the aid of additional short-circuit switches as prior to their charging from a line storer, so that any energy transmission residues improperly remaining will not be able to disturb or falsify the following energy transmission. For this purpose short-circuit switches *k*1 and *k*2 illustrated in FIG. 3 can be utilized. It should also be here noted that it is recommended, for similar reasons, in this as well as in subsequently described circuits, that there be provided a periodic grounding of the multiplex bar M at suitable times.

It thus far has been assumed that energy transmissions take place by means of impulses of one and the same polarity, which, however, may have different magnitudes.

This means that at the condensers C*a* and C*b* serving as line storers only electrical charges with one and the same polarity occur. Also in the condensers serving as intermediate storers, there likewise exclusively occur in this case charges of one and the same polarity. If this condition is not inherently fulfilled, it is possible, as heretofore pointed out, to achieve this by special measures, when alternating voltages and alternating currents of differing frequencies are to be transmitted over the particular connection. These measures are also provided in the circuit represented in FIG. 1, in which there are inserted in the circuit to the condensers C*a* and C*b*, serving as line storers, low passes filters comprising the chokes D*a* and D*b*, and the condensers *a*C and *b*C. To the line section T*a* with the line storer C*a* there is also associated the transformer W*a*. On the secondary winding II, of which there is a positive bias voltage U, with the alternating voltages and currents to be transmitted being fed to its primary winding I. In a corresponding manner there is associated with the line section T*b* and the line storer C*b*. The transformer W*b* to whose secondary winding II likewise is applied a positive bias voltage U, with the alternating voltages and currents to be transmitted being fed to its primary winding I. Due to the effect of the bias voltage applied at the secondary windings II, at the condensers C*a* and C*b*, serving as line storers, only positive voltages can occur, and they can, therefore, be charged only with positive polarity.

There will now be described all connections for the energy transmissions that are necessary in order to bring about a connection of the line sections T*a* and T*b*, for which purpose the time diagrams illustrated in FIG. 6 should be considered, in which the time axis therein in each case extends horizontally with the time points following one another to the right. With reference to time diagram T, K1 and K2, it will be clear when, for the energy transmissions, the switches 1*k*1, 2*k*1, 1*k*2 and 2*k*2 and also the switches *ta* and *tb* belonging to the line switches to be connected are to be operated. During the operating time of switch *ta*, first, over switch 1*k*1, the condenser C1 is charged, the rectifier G1 being traversed in pass direction by the charging current. During the operating time of switch *tb*, first over the rectifier G1 (poled in pass direction) and the switch 1*k*2, the condenser C2 is charged. The condenser C1 is then discharged over the switch 2*k*1 and the rectifier G2, the latter being traversed in pass direction by the discharge current. Finally, over the same rectifier G2, here poled in pass direction, and the switch 2*k*2 the condenser C2 is discharged during the second operating time of the switch *ta*. The previously mentioned short-circuiting of the condensers C1 and C2, serving as intermediate storers, here takes place expediently during the connection of the condenser C*a* serving as first line storer, the switches K1 and K2 completing such short-circuiting. Their operating times are entered in diagrams K1 and K2, such operating times fitting well into the other operating times, if they are at most half as long as the operating times of the switches in the line storers. They may also be still shorter, since an adaptation to a half-oscillation is not necessary. It is possible, correspondingly, to shorten the operating time of switch *ta*. As already stated, with insertion of rectifiers in the transmission paths in the above-described manner it is possible to provide that the energy transmission from and to the line storers, which in each case begins with the switching through of the transmission path concerned, is already ended before the transmission path is interrupted by opening of a switch lying in it. With use of condensers as line storers and as intermediate storers, as well as with insertion of inductive coils in the transmission path, the transmission path must, in each case, form an oscillatory circuit which is so tuned that the length of the resonant half-wave is shorter than the shortest time span occurring, while the transmission path in question is switched through, and it will be recalled that a great tolerance is permissible for the tuning of the oscillatory circuit concerned. Expediently, the length of the switching through of a transmission path is, in each case, determined by the operation of a switch which is allocated to an intermediate storer and over which the transmission path involved passes.

Figure 6:
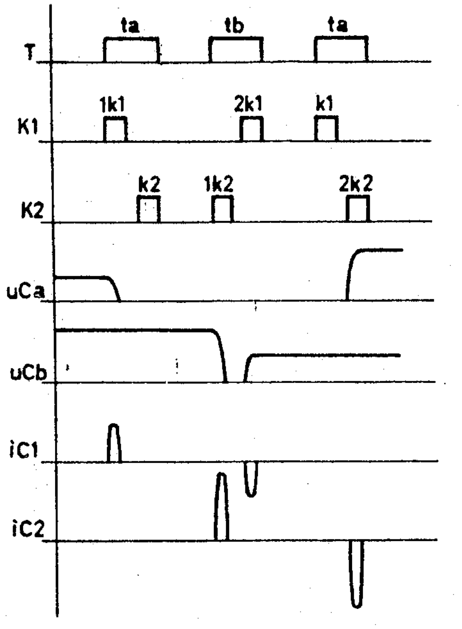
FIGS. 6 and 7 represent time diagrams for the operation of switches inserted in the transmission paths and also for the energy transmissions taking place in each case.

An example of the course of the voltages occurring at the intermediate storers C1 and C2 in this case, as well as of the voltages occurring at the condensers *Ca* and *Cb*, serving the line storers, is illustrated in the previously mentioned FIG. 6 in diagrams *uCa*, *uCb*, *i*C1 and *i*C2. In these diagrams, the time axis, also extends horizontally, with the time points following one another to the right. The diagram *uCa* shows the voltage course on the condenser *Ca*, from which it will be seen that the voltage first lying there disappears during the operation of switch 1*k*1. Simultaneously, according to diagram *i*C1, the condenser C1 is charged by a current. During the operating time of switch 1*k*2, as indicated in diagram *uCb*, the condenser *Cb* is discharged and simultaneously, according to diagram *i*C2 the condenser C2 is charged by a current. During the immediately following operating time for the switch 2*k*1, the condenser C1 is discharged as shown in diagram *i*C1, with the condenser *Cb* being charged in the process as indicated in diagram *uCb*. Finally, during the operating time of switch 2*k*2, condenser C2 is discharged, as indicated in diagram *i*C2. In the process the condenser *Ca* is charged as indicated in diagram *uCa*. The voltages lying on condensers *Ca* and *Cb* at the start of the energy transmission were different, condenser *Ca* having the lower voltage and condenser *Cb* the higher. After conclusion of the energy transmissions considered, the condenser *Ca* has the higher and the condenser *Cb* the lower voltage, and the voltages and the charges of the condensers, therefore, have been exchanged. If the operating times of the centrally located switches 1*k*1, 2*k*1, 1*k*2 and 2*k*2, allocated to the intermediate storers, are compared with the time spans during which the voltages and current changes, appearing in the diagrams, take place in each case, it will be apparent that the latter are completed during the half operating time of the switch concerned allocated to an intermediate storer. These voltage and current changes bring about in each case the discharge of the one and the charging of the other of the two condensers involved, with retransfers being suppressed by the rectifiers inserted in the transmission paths.

Figure 5:
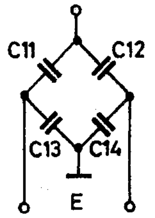

As previously mentioned, certain changes of the tuning of the oscillatory circuits that are switched through in the energy transmissions are permissible, without, for this reason, requiring a change in the operating time of the centrally disposed switch. This makes possible a parametric amplification with the aid of condensers serving as intermediate storers. It is also advantageous that the condensers, serving as intermedite storers, in each case be supplied only with voltages of one and the same polarity. For a parametric amplification, the capacitance of the condenser concerned must in each case be reduced before its discharge, the energy to be supplied for this purpose serving to raise its energy content. Condensers suitable for this purpose are already known. Expediently such a condenser, is subdivided into several partial condensers such a condenser being illustrated in FIG. 5. This condenser consists of the four partial condensers C11, C12, C13 and C14, which are arranged in the form of a bridge circuit. Two of the oppositely disposed connecting points of the partial condensers serve as terminals for the condenser. Over the other two oppositely situated terminals E, a voltage is supplied which effects a change in the capacitance of the individual condensers. As condensers which are controllable by such a voltage there are available, for example, so-called varactors, i.e., semiconductor diodes which are operated in the blocking range. The control voltage supplied at the terminals E is divided over the intermediate bridge branches, the partial condensers of which are appropriately dimensioned whereby no voltage differences exists between the other two oppositely situated junctions. It cannot, therefore, influence the rest of the circuit, into which this variable condenser is inserted.

It will also be noted that the inductive coils previously described, which are inserted in the transmission path, can be utilized for the parametric amplification, such coils in FIG. 1 being designated L*a* and L*b*, and allocated to the respective line sections. They also may be replaced partially or entirely by a coil which would be inserted in the multiplex bar M. This coil thus would be centrally disposed and could likewise be utilized for the parametric amplification. A coil serving as parametric amplifier expediently may be subdivided into partial coils with a number of windings, which subdivision corresponds to the subdividing of a condenser into several partial condensers.

Figure 4:
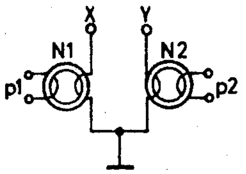

As intermediate storers there also may be used, in addition to condensers, other reactances, which are then also utilizable for parametric amplification. They may be excited, for example, as ferromagnetic core storers, consisting of a material with remanence, having an approximately linear working characteristic line for the magnetic properties within the working range utilized for energy storages. In a storage operation there takes place in the core storer concerned, a magnetization proceeding from a previously established magnetic initial state, which magnetization remains preserved until the storage-removal. This magnetization corresponds there to the transmitted energy. In the storage removal there then takes place an energy transmission from the core storer serving as intermediate storer to a line storer. This energy transmission takes place with the aid of a reading impulse, which restores the core storer involved to its initial magnetic state. Such core storers are shown in FIG. 4, in which the illustrated circuit would replace that part of the circuit illustrated in lying below the switching points X and Y. The two core storers are designated as N1 and N2, and the reading impulses are fed over the terminal pairs *p*1 and *p*2 to the windings there connected. Here, too, it may be desirable in each case to feed to such core storers, serving as intermediate storers, special resetting impulses before a storage is effected thereto, whereby the core storers will always be precisely set into their established initial magnetic state. With use of core storers and other switching elements as intermediate storers, special possible properties thereof, such as inductance, may also be utilized to bring about the complete and rapid discharge of condensers serving as line storers. In this event, coils with less inductance than otherwise may be inserted into the transmission paths or, possible, no coils may be required.

The details of the circuit example illustrated in FIG. 2 will now be considered, in which the energy transmissions for the connection of two line sections are accomplished in a somewhat different manner than in the circuit example, previously described in detail, illustrated to FIG. 1, and utilizes two multiplex bars. For the purpose of differentiation between outgoing and incoming build-up direction, each line section is connectable over a first switch to an outgoing multiplex bar and over a second switch to an incoming multiplex bar, which are respectively designated as M*ab* and M*an*. The energy transmissions are in each case effected over these two multiplex bars and over the same two central intermediate storers, designated S1 and S2. Such central intermediate storers are likewise connectable over central switches 1*k*1, 2*k*1, 1*k*2 and 2*k*2 to the two multiplex bars. In this circuit, in each case, one of the two line storers is connected to the same multiplex bar and simultaneously the other line storer is connected to the other multiplex bar, while the two central intermediate storers S1 and S2 are alternately connected over central switches both to the one and also to the other multiplex bar in such a manner that, after the energy transmissions taking place in the process, the two line storers have exchanged their energy content.

The two intermediate storers are then usable for energy exchange between other line storers. The energy transmissions thus can be executed for several connections over the multiplex bars and the two intermediate storers.

In this circuit a transmission path leads in each case over one of the rectifiers 1G1, 2G1, 1G2 or 2G2, which through suitable operation of the central switches 1*k*1, 2*k*1, 1*k*2 and 2*k*2, are in each case inserted into the transmission path concerned. To permit the transmission of alternating voltages and alternating currents, here, too, low pass filters are inserted in the circuit of the line storers in the same manner as in the circuit according to FIG. 1, which low pass filters are connected with the line sections over their transformers W*a* and W*b*. The alternating potentials to be transmitted are supplied, to their primary windings I, and the bias potential +U is applied to their secondary windings, such bias voltage corresponding at least to the amplitude of the greatest alternating voltage to be transmitted and having the same polarity as the charges which occur in the condensers C*a* and C*b* serving as storers. As in the previous circuit, the presence of the bias potential +U, insures that the condensers C*a* and C*b* are only positively charged.

Of the line storers connectable to the multiplex bars M*an* and M*ab*, which terminate the line sections, here, as previously mentioned, there are shown the line storers C*a* and C*b* terminating the line sections T*a* and T*b*. The line storer C*a* is connectable over switch *anta* to multiplex bar M*an* and over switch *abta* to the multiplex bar M*ab*. The multiplex bar M*ab* serves for the retransmission of outgoing traffic and is designated in the following as the outgoing multiplex bar. Line sections from which a connection is to be built up in outgoing direction are therefore, in such case, connected over the appertaining switch concerned to the multiplex bar M*ab*. Likewise, multiplex bar M*an* serves as incoming multiplex bar and is thus designated in the following. Line sections to which a connection is to be built up in incoming direction are connected over their cooperable switches to the multiplex bar M*an*. In the connection of the line section concerned, or of the appropriate line storer to the one or other multiplex bar, the distinction thus is made between outgoing and incoming connection build-up direction. The switches used for the connections likewise, may be operated by means of a sequence of control pulses. Since one of the two line storers involved is simultaneously connected to one multiplex bar and the other line storer is connected to the other multiplex bar, the same sequence of control impulses can be used for the actuation of both switches involved. In this circuit embodiment, condensers also are utilized as line storers, and are recharged in the course of the energy transmission. At the end of a complete transmission the two condensers concerned serving as line storers have exchanged their charges. Low pass filters are inserted between the line storers and the corresponding line sections, comprising the chokes D*a* and D*b* and the condensers *a*C and *b*C.

In the following, the manner of the operation of the circuit illustrated in FIG. 2 will be described, wherein, as intermediate storers, the condensers C1 and C2 illustrated in FIG. 3 are utilized. Also disposed in the transmission paths connected in each case, is a coil having inductance, comprising coils L*a* and L*b* allocated to the respective subscriber lines. The energy transmissions to the storer concerned always take place in the form of a half oscillation in the oscillatory circuit just connected by the operation of the cooperable switches. These energy transmissions and the sequence of the operations of the switches concerned are individually represented in the time diagrams of FIG. 7. In the diagram designated T, K1 and K2 is illustrated the operation of the switches involved. Diagram T indicates when the switches *abta* and *antb* allocated to line sections T*a* and T*b* are operated, assuming, the line section T*a* has outgoing and the line section T*b* incoming communication. If the line section T*a* had incoming and the line section T*b* outgoing communication, operation of the switches *anta* and *abtb* would be required, in each case, the two switches involved being operated simultaneously. During the operating time of the switches, first over switches 1*k*1 and 2*k*2, and then over switches 2*k*1 and 1*k*2, the condensers C1 and C2 are alternately connected to the two multiplex bars M*an* and M*ab*. The operations of these switches are illustrated in diagrams K1 and K2. Diagram K1 discloses that the condenser C1 is first connected over switch 1*k*1 to the outgoing multiplex bar M*ab*. The switch 2*k*1 is then operated, whereby the condenser C1 is connected to the incoming multiplex bar M*an*. In a similar manner, according to diagram K2, during the operating time of switch *abta* and *antb* the condenser C2 is first connected over switch 2*k*2 to the incoming multiplex bar M*an* and then by switch 1*k*2 to the outgoing multiplex bar M*ab*. At the same time, there is thus connected to the same multiplex bar, in each case, only one of these two condensers.

Figure 7:
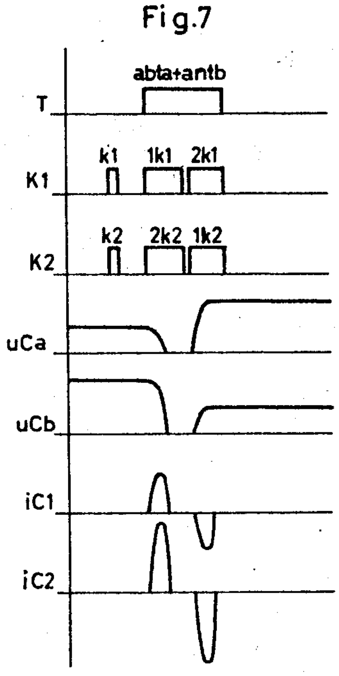

Diagrams *u*C*a*, *u*C*b*, *i*C1, and *i*C2 of FIG. 7, illustrate the course of the voltages in the condensers C*a* and C*b*, serving as line storers, as well as the course of the currents in the condensers C1 and C2, serving as intermediate storers. The energy transmissions, here, too, always take place in the form of a half-oscillation. Diagram *u*C*a* illustrates the voltage course in condenser C*a*, in which it will be noted that the voltage present disappears during the operation of switch 1*k*1. Simultaneously, according to diagram *i*C1, condenser C1 is charged by a current half-wave, and during the simultaneous operation of switch 2*k*2 the voltage lying on condenser C*b* disappears, as apparent from diagram *u*C*b*. Simultaneously, according to diagram *i*C2, the condenser C2 is charged by a current half-wave, following which the switches 2*k*1 and 1*k*2 are operated. The operation of the switch 2*k*1, as apparent from diagram *i*C1, results in the condenser C1 being again discharged while the condenser C*b* is charged, as illustrated in diagram *u*C*b*. The operation of switch 1*k*2 results in the corresponding operations for the condensers C1 and C2, as is apparent from diagrams *i*C2 and *u*C*a*. The voltages present on condensers C*a* and C*b* at the start of the energy transmissions were different, condenser C*a* having the lower voltage and condenser C*b* the higher, and upon conclusion of the energy transmissions considered, condenser C*a* has the higher potential and condenser C*b* the lower. The charges of the condensers, therefore, have been interchanged.

In the circuit, too, the oscillatory circuits belonging to the particular transmission paths switched through are so tuned that a half-oscillation of such an oscillatory circuit always takes less time than the duration of the operating period of the corresponding centrally situated switch. The voltage and current changes indicated in these diagrams therefore, take considerably less time than the operation of the switch concerned allocated to an intermediate storer. Such voltage and current changes always bring about the discharge of the one and the charging of the other of the two condensers taking part. Retransfers are here suppressed by the rectifiers inserted in each case, in the transmission paths. Great tolerances are thus permissible for the operating time of the centrally situated switches. Changes in the tuning of the vibratory circuits responsive to capacitance change in the case of parametric amplification here, too, have no direct influence on the necessary operating times for the switches involved. Likewise, the condensers serving as intermediate storers, as well as any parametric amplifiers, are fed in each case with voltages of one and the same polarity. It should be further noted that for the short-circuiting of the condensers C1 and C2, serving as intermediate storers, it is also possible to use the switches *k*1 and *k*2 shown in the circuit according to FIG. 3. Expediently they are always operated simultaneously, and before energy transmissions are to be made between the two line storers, and the length of their operation can be shorter than the length of the operation of the other centrally situated switches. Their operation is also as depicted in diagrams K1 and K2.

Also, in the circuit illustrated in FIG. 2, there can be used as intermediate storers, besides condensers, other types of switching elements. Among these, for example, are the previously mentioned ferromagnetic core storers. Here, too, in use of other intermediate storers, there may be inserted in the transmission path coils of lower inductance than otherwise or, such coils possibly be omitted. The form of the curves for the voltage and current changes in energy transmissions can deviate somewhat from those illustrated in FIG. 7 where other intermediate storers are employed.

It should also be pointed out that also in the circuit example illustrated in FIG. 2 the energy transmissions from and to the storers, which in each case begins with the switching through of the transmission path concerned, is already ended before the transmission path is interrupted by opening of a switch disposed therein. Here, too, it is expedient to determine the duration of the connection of a transmission path in each case by the operation of that centrally located switch allocated to an intermediate storer, over which the transmission path involved proceeds.

Centrally disposed switches, can be more accurately controlled with the same expenditure than the switches allocated to the line sections. This is also true of the circuit example illustrated in FIG. 1. The construction of the switches and control devices which are to control these switches have not been described in detail herein. Such switches, however, and the associated control devices are in themselves known (see U.S. Patent 2,936,-337, issued on May 10, 1960).

Changes may be made within the scope and spirit of the appended claims which define what is believed to be new and desired to have protected by Letters Patent.

1. A circuit for pulsewise energy transmission between line sections each of which is terminated by a respective line storer comprising:

at least one multiplex bar, conductor means forming a plurality of energy transmission paths for interconnecting selected line sections via said multiplex bar, switching means including a plurality of line section switches connected between respective line storers and said multiplex bar and operable by sequences of control impulses for effecting operable connection of said line sections with said multiplex bar for the transmission of energy between said line storers, and unidirectional pulse transmission means in the form of a plurality of non-amplifying passive rectifiers each connected into one of said energy transmission paths for controlling the direction of current flow in said energy transmission path and being poled to transmit current pulses of a given polarity while simultaneously blocking, without gates, current pulses of a polarity opposite to said given polarity, thereby to prevent retransfers of energy in a reverse direction along the respective energy transmission paths.

2. A circuit according to claim 1 wherein information at the line sections is in the form of alternating current energy, said circuit further comprising a low-pass filter connected to each of said line storers and having a limit frequency which is smaller than one half the sequence frequency of the control impulses controlling said line section switches, a transformer for each line section having a primary winding for connection with the line section and receiving said alternating current energy and a secondary winding connected with the filter for the line section, and a source of bias voltage connected to said secondary winding and having an amplitude which is at least equal to the maximum amplitude of said alternating current energy and having a polarity coordinated with the polarity of the current pulses to be transmitted by said rectifiers so that the transformers supply to said line storers charges of said given polarity.

3. A circuit according to claim 1 wherein further switching means are inserted in the respective energy transmission paths in serially connected relation to the respective rectifiers, said further switching means being operable in synchronism with said line section switches to complete only those energy transmission paths having rectifiers poled to transmit said current pulses of said given polarity.

4. A circuit according to claim 3 further comprising two central intermediate storers for coupling with said multiplex bar via said energy transmission paths, and under the control of said further switching means, said further switching comprising central switches serving to alternately connect said central intermediate storers with said multiplex bar via respective ones of said rectifiers, and being operated in such a sequence that alternately only an energy transmission path with a rectifier poled towards a given central intermediate storer is completed, and then only an energy path having a rectifier poled away from said central intermediate storer is completed, and the central switches being operated in such a sequence that in each case of the simultaneous operation of a line section switch and a central switch to complete an energy transmission path, there takes place energy transfer only of said given polarity for such energy transmission path and only to a previously emptied central intermediate storer in the case of energy transmissions to such storer.

5. A circuit according to claim 4 comprising an outgoing multiplex bar connected to each line section by way of said switching means, an incoming multiplex bar connected to each line section by way of said switching means, and each of said multiplex bars being further connected by way of said switching means to said two central intermediate storers so that one of the two line storers is connected to one multiplex bar and the other line storer to the other multiplex bar simultaneously while the two central intermediate storers are alternately connected via said central switches to said two multiplex bars for exchanging energy between said two line storers by way of said two intermediate storers.

6. A circuit according to claim 1, wherein condensers are provided as line storers.

7. A circuit according to claim 6, wherein coils having inductance are provided, which in each case are disposed in the energy transmission paths connected by the operation of the switching means, and by means of their inductance effect an energy transmission in the form of a partial oscillation substantially without reversal of polarity.

8. A circuit according to claim 7, wherein the inductance active for an energy transmission is in each case distributed over a decentralized coil and at least one central coil.

9. A circuit according to claim 4, wherein the intermediate storers are constructed in the form of condensers.

10. A circuit according to claim 9, wherein the condensers serving as intermediate storers are in each case short-circuited before their charging takes place from a line storer by means of additional short-circuit switches.

11. A circuit according to claim 4, wherein reactances are employed as intermediate storers, and are constructed as parametric amplifiers.

12. A circuit according to claim 4, wherein the intermediate storers are constructed as ferromagnetic core storers, which consist of a material with remanence and with an essentially linear working characteristic line for the magnetic properties within the working range utilized for energy storage operations.

13. A circuit according to claim 12, wherein the energy transmissions from a core storer serving as intermediate storer to a line storer, each take place with the aid of a reading impulse, which restores the core storer concerned to its magnetic initial state.

14. A circuit according to claim 12, wherein, to the core storers serving as intermediate storers, prior to a storage therein, are supplied with a special resetting impulse, which set the core storers precisely in their initial magnetic state.

15. A circuit according to claim 4, wherein the operating times for the central switches allocated to the intermediate storers are at most half as long as the operating times for the line section switches allocated to the line sections.

16. A circuit according to claim 4, wherein the energy transmission from and to the storers, which in each case begins with the connection of the transmission path involved, is ended before the transmission path is interrupted by the opening of the switching means disposed therein.

17. A circuit according to claim 16, in which, in the transmission path between the storers involved, consisting of condensers, there is disposed, in each case, at least one coil, wherein the particular transmission path forms an oscillatory circuit which is so tuned that the length of its resonant half-wave is shorter than the shortest time span occurring during which the transmission path involved is connected.

18. A circuit according to claim 4, wherein the duration of the connection of a transmission path is determined in each case by the operation of the central switch and allocated to an intermediate storer over which the transmission path involved extends.

19. A circuit for pulsewise energy transmission between line sections each of which is terminated by a respective line storer comprising:

at least one multiplex bar, conductor means forming a plurality of energy transmission paths for interconnecting selected line sections via said multiplex bar, switching means including a plurality of line sections switches connected between the respective line storers and said multiplex bar and operable by sequences of control impulses for effecting operable connection of said line sections with said multiplex bar for the transmission of energy between said line storers, and unidirectional pulse transmission means comprising unidirectionally conductive switches each connected into one of the energy transmission paths for controlling the direction of current flow in said energy transmission path and being poled to transmit current pulses of a given polarity while simultaneously blocking current pulses of polarity opposite to said given polarity thereby to prevent retransfers of energy in a reverse direction along the respective energy transmission paths.

20. A circuit for the transfer of energy in the form of pulses between line sections each of which is terminated by a respective line storer and connectable to an incoming multiplex bar and an outgoing multiplex bar, comprising a first line switch connected between a first line storer and the incoming multiplex bar, a second line switch connected between a second line storer and the outgoing multiplex bar, two intermediate storers, first means for unidirectionally conducting energy from the incoming multiplex bar to a first of said intermediate storers and from the outgoing multiplex bar to a second of said intermediate storers during one interval of time, second means for unidirectionally conducting energy from said first intermediate storer, to the outgoing multiplex bar and from said second intermediate storer to the incoming multiplex bar during another interval of time spaced from one interval of time, a low-pass filter connected to one of the line storers and having a limit frequency which is smaller than half the sequence frequency of the respective line switch, a transformer having a primary winding and a secondary winding, means connecting the energy in the form of alternating current to said primary winding, and a source of bias voltage connected to said secondary winding and having an amplitude which is equal to the greatest amplitude of the alternating current energy.

21. A circuit for the transfer of energy in the form of pulses between line sections each of which is terminated by a respective line storer and connectable to an incoming multiplex bar and an outgoing multiplex bar, comprising a first line switch connected between a first line storer and an incoming multiplex bar, a second line switch connected between a second line storer and the outgoing multiplex bar, two intermediate storers, first means for unidirectionally conducting energy from the incoming multiplex bar to a first of said intermediate storers and from the outgoing multiplex bar to a second of said intermediate storers during one interval of time, second means for unidirectionally conducting energy from said first intermediate storer to the outgoing multiplex bar and from said second intermediate storer to the incoming multiplex bar during another interval of time spaced from one interval of time, said first means including at least a first rectifier, a first intermediate switch connected in series with said first rectifier, and means for closing said first intermediate switch during said one interval of time, and said second means including at least a second rectifier, a second intermediate switch connected in series with said second rectifier, and means for closing said second intermediate switch during said other interval of time.

22. A circuit for the transfer of energy in the form of pulses between line sections each of which is terminated by a respective line storer and connectable to an incoming multiplex bar and an outgoing multiplex bar, comprising a first line switch connected between a first line storer and an incoming multiplex bar, a second line switch connected between a second line storer and the outgoing multiplex bar, two intermediate storers, first means for undirectionally conducting energy from the incoming multiplex bar to a first of said intermediate storers and from the outgoing multiplex bar to a second of said intermediate storers during one interval of time, second means for unidirectionally conducting energy from said first intermediate storer to the outgoing multiplex bar and from said second intermediate storer to the incoming multiplex bar during another interval of time spaced from one interval of time, said first means including a first rectifier, a first intermediate switch connected in series with said first rectifier between the incoming multiplex bar and said first intermediate storer, a second rectifier, a second intermediate switch connected in series with said second rectifier between the outgoing multiplex bar and said second intermediate storer, and means for simultaneously closing said first and said second intermediate switches during said one interval of time, and said second means including a third rectifier, a third intermediate switch connected in series with said third rectifier between the outgong multiplex bar and said first intermediate storer, a fourth rectifier, a fourth intermediate switch connected in series with said fourth rectifier between the incoming multiplex bar and said second intermediate storer, and means for simultaneously closing said third and said fourth intermediate switches during said other interval of time.

References Cited

UNITED STATES PATENTS

| | | | |
|---|---|---|---|
| 3,061,681 | 10/1962 | Richards | 179—15 |
| 2,962,551 | 11/1960 | Johannesen | 179—15 |

RALPH D. BLAKESLEE, Primary Examiner